(12) United States Patent
Dragovan

(10) Patent No.: US 6,820,986 B2
(45) Date of Patent: Nov. 23, 2004

(54) PRECISION FORMED MEMBRANE SURFACE FOR ELECTROMAGNETIC RADIATION CONCENTRATION AND METHOD OF FORMING SAME

(76) Inventor: Mark W. Dragovan, 5140 S. Hyde Park Blvd., #20F, Chicago, IL (US) 60615

( * ) Notice: Subject to any disclaimer, the term of this patent is extended or adjusted under 35 U.S.C. 154(b) by 0 days.

(21) Appl. No.: 10/158,547

(22) Filed: May 29, 2002

(65) Prior Publication Data

US 2003/0021044 A1 Jan. 30, 2003

Related U.S. Application Data

(62) Division of application No. 09/387,843, filed on Sep. 1, 1999, now Pat. No. 6,502,944.

(51) Int. Cl.[7] ................................................. G02B 5/08
(52) U.S. Cl. ..................... 359/847; 359/851; 359/868
(58) Field of Search .............................. 359/224, 846, 359/847, 848, 867, 868, 869

(56) References Cited

U.S. PATENT DOCUMENTS

| | | | | |
|---|---|---|---|---|
| 4,046,462 A | * | 9/1977 | Fletcher et al. | 359/847 |
| 5,016,998 A | * | 5/1991 | Butler et al. | 359/847 |
| 5,307,082 A | * | 4/1994 | Silverberg | 343/915 |
| 6,113,242 A | * | 9/2000 | Marker et al. | 359/847 |
| 6,502,944 B1 | * | 1/2003 | Dragovan | 359/847 |

* cited by examiner

*Primary Examiner*—Mark A. Robinson
(74) *Attorney, Agent, or Firm*—Bell Boyd & Lloyd LLC

(57) ABSTRACT

A precision surface formed of a thin stretchable membrane. The shape and curvature of the formed surface are determined by the boundary over which the membrane is stretched, a forming pressure (if applicable), and the membrane's mechanical properties. The surface has the property that it can concentrate electromagnetic radiation and, if appropriate materials for the membrane and boundary are chosen, the resulting system can have very low mass with diffraction limited optical performance. The surface may be incorporated into a telescope or imaging system wherein the system consists of a large primary optical element and subsequent corrective optical elements.

28 Claims, 6 Drawing Sheets

PRECISION FORMED MEMBRANE SURFACE FOR ELECTROMAGNETIC RADIATION CONCENTRATION AND METHOD OF FORMING SAME

This is a divisional of application Ser. No. 09/387,843 filed Sep. 1, 1999, now U.S. Pat. No. 6,502,944.

BACKGROUND OF THE INVENTION

1. Field of the Invention

The present invention relates, generally, to the construction of telescope or imaging systems and, more specifically, to systems which use optical elements having shapes and curvatures formed by the bending or stretching of a membrane over an appropriate boundary wherein such membrane assumes a shape that can concentrate electromagnetic radiation.

2. Description of the Prior Art

Known telescope systems typically are formed either with only a single primary optical element or with a combination of a primary element along with other optical elements so as to improve the performance of the overall system. Indeed, if the field of view needs to be larger than that which is afforded by a single primary optical element, subsequent optics (a secondary and tertiary) can be used to correct any aberrations induced by the primary optical element. A number of designs for two and three mirror systems have been developed over the years resulting in systems which have large focal surfaces. See *Astronomical Optics*, Schroeder 1987. Such systems are typically "on-axis", wherein the secondary and tertiary optics obstruct the primary optical element. However, the scattering and diffraction of the incident electromagnetic radiation by both the secondary optics and its support structure reduces the performance of the overall on-axis system. This is particularly problematic for the observation of low-contrast objects as well as in communications systems where cross-talk between nearby antennas is undesirable.

One solution to the aforementioned problem with on-axis designs is to use an off-axis design. Unfortunately, however, the field-of-view of such off-axis designs is generally limited unless steps are taken to control the new set of off-axis aberrations. One known solution to control such off-axis aberrations is to tip the secondary reflector with respect to the primary optical element. As a result, the aberrations induced by the tipped secondary reflector cancel those of the off-axis primary optical element, thus affording a performance which is substantially equal to that of an unobstructed on-axis reflector of the same aperture. Be that as it may, the field-of-view for such a system still has much to be desired. Thus, it can be appreciated that an off-axis system with a wide field-of-view would be desirable in either a telescope or imaging system.

Further, there are problems associated with the construction of precision reflectors. Such problem of constructing precision reflectors (initially for use in telescope mirrors) has a long history tracing back to Gregory (1663), Newton (1668) and Cassegrain (1672). The first successful reflectors using glass substrates with silvered reflecting surfaces were constructed in the late 1850's by von Steinheil in Germany and Foucault in France. The function of any glass or metal mirror is to act as a substrate providing support for a thin layer of high reflectivity material—the glass or metal being formable into shapes that have useful optical properties. By examining the areal densities of the reflecting layer and the substrate we find that the current state-of-the-art has much to be desired, wherein a factor of at least $10^7$ in areal density exists between the reflecting surface and the supporting substrate.

The areal density of the reflecting layer is given by $$\sigma_{m} = \rho t$$

with t being the thickness of the reflecting layer, and p the density. The thickness of the reflecting layer of a high electrical conductivity metallic film can be determined, to good approximation for a specific reflecting material, by considering the skin depth $$\delta = \frac{1}{\sqrt{\pi \nu \mu \sigma_e}},$$

where $\sigma_e$ is the conductivity of the reflecting surface, v is the frequency of the electromagnetic radiation, and $\mu$ is the permittivity of the reflecting surface. For a very good conductor like copper, $\sigma_e = 5.7 \times 10^7$ $\Omega^{-1}$/m and $\mu=1$. If we consider a drop in intensity of $10^6$ to be opaque, we find that $t=7\delta$. In the case of optical light ($\lambda=0.5$ $\mu$m), the film only has to be 50 nanometers thick to reflect the incident light with little loss; for microwaves ($\lambda=1000$ $\mu$m), a 1.7 $\mu$m thickness is required. For this example, $\sigma_m \sim 2 \times 10^{-3}$ g/m$^2$ in distinct contrast to the areal density of the substrate material, which can be many orders of magnitude greater.

Current technology millimetric telescopes have densities of order 10 kg/m$^2$, about a factor of $10^7$ between the reflecting layer's density and that of the support structure. For optical telescopes, the situation is much worse with the current state of the art having areal densities of order 150 kg/M$^2$ (the NASA 2.5 m HST and the Air Force Starfire 3.5 telescopes). By examining existing telescopes one finds that the mass density of the supporting substrate (generally some form of glass) is $$\sigma_m \propto (\text{aperture})^{0.5}.$$

This is independent of the technology used, or the epoch when the telescope was constructed.

By comparison, the areal density of a membrane reflector system scales differently and is straightforward to calculate. For the reflective membrane itself $$\sigma_m = \rho_m t.$$

For the supporting ring $$\sigma_\oplus = -\frac{4\rho_\oplus h(d)\Delta d}{d}$$

here h(d) is the functional dependence of the ring's height on the diameter of the ring, and $\Delta d$ is the width of the ring. The total density is simply the sum $$\sigma = \sigma_m + \sigma_\oplus = \rho_m t + \frac{4\rho_r h(d)\Delta d}{d}.$$

It is instructive to note two cases, h(d)=h (a constant height ring), and h(d)h=$_0$(d/d$_0$)$^{1/3}$ (a constant stiffness ring). In the first case, the areal density decreases with aperture as it does for the constant stiffness case. Only if the ring has h(d)=h$_0$(d/d$_0$)$^\alpha$ with $\alpha>1$ does $\sigma$ grow with $$\sigma = \rho_m t + 4\rho_\oplus \left(\frac{ho}{do}\right)\left(\frac{d}{do}\right)^{\alpha-1} \Delta d$$

This is in distinct contrast to the data for current mirrors, which have $\sigma \propto d^{0.5}$. For larger diameters, the thickness of the membrane can be reduced, since for a given deflection the pressure can be lower. Thus, not only is a membrane reflector less massive to being with, but the areal density can actually decrease with larger apertures if the ring and membrane are chosen correctly.

Clearly, the areal density of a telescope or imaging system could be reduced by large orders of magnitude by constructing only the desired reflective surface and not the heavy supporting structure needed to control the gravitationally induced deformations. To date, however, such design has not been practically implemented. Further, it is not known to use a space curve as a boundary to produce off-axis surfaces that can represent a segment of a conic section. Moreover, the prior art does not provide for the figuring of such a surface by selectively distorting the associated boundary. In addition, there is nothing in the prior art which discusses the re-imaging of an off-axis optical element onto a deformable tertiary so as to correct for non-ideal primary surface shape.

SUMMARY OF THE INVENTION

Therefore, the present invention is directed to a method for constructing telescope systems, antenna systems, imaging systems, or other concentrators of electromagnetic radiation having optical elements whose shapes, orientations and locations are specifically chosen to achieve a diffraction limited optical system. The individual optical elements may be constructed by deforming a membrane such that non-symmetric aspherical low-mass surfaces are achieved.

Accordingly, in an embodiment of the present invention, an apparatus for electromagnetic radiation concentration is provided which includes: a peripherally-disposed boundary member, the boundary member having a shape defined as a space curve which closes upon itself and which need not be circular nor planar; and a one-piece membrane stretched over the boundary member and secured with respect thereto, the membrane having both a curved shape and a substantially isotropic thickness and being supported entirely upon the boundary member at outermost edges of the membrane.

In an embodiment, the membrane is pressure-formed to obtain the curved shape and substantially isotropic thickness.

In an embodiment, the curved shape has a zero Gaussian curvature.

In an embodiment, the curved shape has a non-zero Gaussian curvature.

In an embodiment, the membrane is elastically deformed to have the curved shape.

In an embodiment, the membrane is permanently deformed to have the curved shape.

In an embodiment, the curved shape is a biconic form with additional higher order polynomial terms.

In an embodiment, the membrane is formed from a single piece of electro-formed foil.

In an embodiment, the curved shape concentrates reflected electromagnetic radiation to an off-axis region.

In an embodiment, the apparatus further includes: a high electrical conductivity material formed over a surface of the membrane for reflectivity.

In an embodiment, the apparatus further includes: a substantially-circular clamp member, the clamp member positioned in substantially fixed and outwardly-adjacent relation to the boundary member, the clamp member securely holding the membrane in stretched formation over the boundary member.

In an embodiment, the clamp member includes a plurality of interlocking grooves between which outermost edges of the membrane are securely held.

In an embodiment, the apparatus further includes: an adjustment device connected to the boundary member, the adjustment device capable of changing the shape of the boundary member so as to subsequently alter the curved shape of the membrane.

In an embodiment, the clamp member is integrally-formed with the boundary member.

In an alternative embodiment of the present invention, a method of forming an apparatus for electromagnetic radiation concentration is provided which includes the steps of: providing a peripherally-disposed boundary member, the boundary member having a shape defined as a space curve which closes upon itself and which need not be circular nor planar; placing a one-piece, stretchable membrane over the boundary member; securing outermost edges of the membrane with respect to the boundary member; deforming the membrane to effect both a curved shape and a substantially isotropic thickness to the membrane; and supporting the membrane entirely upon the boundary member at the outermost edges of the membrane.

In an embodiment of the method, the curved shape has a zero Gaussian curvature.

In an embodiment of the method, the curved shape has a non-zero Gaussian curvature.

In an embodiment of the method, the step of deforming the membrane includes applying pressure to one side of the membrane.

In an embodiment of the method, the applied pressure is positive pressure.

In an embodiment of the method, the applied pressure is negative pressure.

In an embodiment, the method further includes the step of: maintaining the applied pressure wherein the curved shape of the membrane is elastically maintained.

In an embodiment, the method further includes the step of: removing the applied pressure wherein the curved shape of the membrane is permanently maintained.

In an embodiment, the method further includes the step of: cooling the boundary member after the step of applying pressure so as to cool and rigidize the membrane.

In an embodiment of the method, the curved shape is a biconic form with additional higher order polynomial terms.

In an embodiment of the method, the membrane is formed from a single piece of electro-formed foil.

In an embodiment, the method further includes the step of: applying a high electrical conductivity material over a surface of the membrane for reflectivity.

In an embodiment of the method, the curved shape concentrates reflected electromagnetic radiation to an off-axis region.

In an embodiment, the step of securing outermost edges of the membrane further includes the step of: providing a substantially-circular clamp member, the clamp member positioned in substantially fixed and outwardly-adjacent relation to the boundary member, the clamp member securely holding the membrane in stretched formation over the boundary member.

In an embodiment of the method, the outermost edges of the membrane are securely held between a plurality of interlocking grooves in the clamp member.

In an embodiment, the method further includes the step of: adjusting the shape of the boundary member so as to subsequently alter the curved shape of the membrane.

In an embodiment of the method, the clamp member is integrally-formed with the boundary member.

The present invention thereby offers a number of important advancements to the art of constructing the aforementioned systems, including:

Ultra-low areal densities (<2.5 kg/m$^2$) are possible for the individual elements and hence for the entire systems.

The telescope or imaging system of the present invention can achieve diffraction limited performance by combining the primary optical element with subsequent adaptable optics (a secondary and tertiary) to correct for the aberrations of the primary.

The tertiary is located at a position which is a demagnified image of the primary.

Lower total cost than conventional telescopes, due to lower total mass.

Optical advantages: not segmented, lower scattering, low background primary reflector.

Both axis-symmetric and non-symmetric surfaces are constructable by choosing the appropriate boundary for the membrane. The latter is particularly difficult to fabricate using conventional techniques. An off-axis telescope has major advantages when used for low background observations.

Accordingly, the present invention allows for an optical layout consisting of a large primary optical element that can be formed by the inventive membrane, secondary and tertiary optics, and the structures and surfaces needed to construct the membrane reflector. This combination of secondary and tertiary reflectors provides for both a wide field and the correction of aberrations due to defects in the primary optical element. An additional feature of this design is that the tertiary may be rotated about an axis orthogonal to the optical axis, thereby effecting a change in the observing direction without changing the illumination of the primary optical element. The system's unique features are: a completely unobstructed optical system, low mass, and the ability to quickly switch from one observing position another by rotating the tertiary.

Additional features and advantages of the present invention are described in, and will be apparent from, the Detailed Description of the Preferred Embodiments and the Description of the Drawing.

DETAILED DESCRIPTION OF THE PREFERRED EMBODIMENTS

Deformable surfaces, such as those of the present invention, can be categorized by their Gaussian curvature. Indeed, an intrinsic property of any surface is its Gaussian curvature. All surfaces can be broadly categorized as either (1) those that have Gaussian curvature of zero, and (2) all others. As is well known from differential geometry, the Gaussian curvature of a surface is given by $K=K_1 K_2$, where $K_1$ and $K_2$ are the principal curvatures at a given point on the surface.

Figure 1:
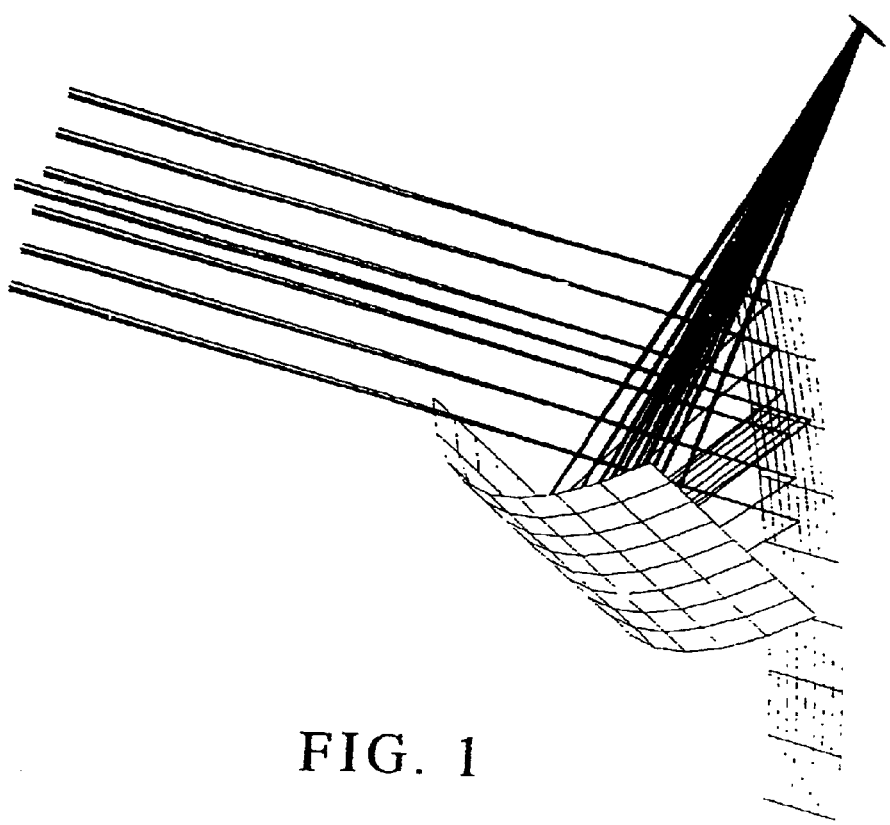
FIG. 1 shows a perspective view of a two-mirror primary reflector.
Figure 2:
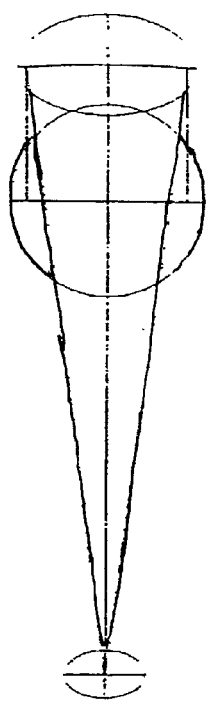
FIG. 2 shows a top view of the two-mirror primary reflector of FIG. 1.
Figure 3:
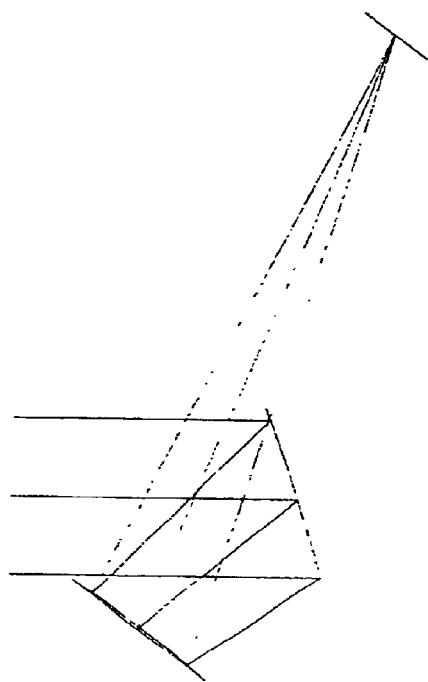
FIG. 3 shows a side view of the two-mirror primary reflector of FIG. 1.

A surface with zero Gaussian curvature either is flat or has the shape of a trough, so that one of the principal curvatures is always zero. Such a surface can be formed by bending along only one axis. If the shape of the surface in the curved direction is a parabola, then a line focus will result. To produce a point focus, a system of two trough-shaped reflectors, properly oriented with respect to each other, must be used. A perspective view of such a system is presented in FIG. 1. Top and side views are presented in FIGS. 2 and 3, respectively. The cylindrical-parabolic surfaces are formed by tensioning a reflective foil over a frame which has a parabolic contour along one axis and is rigid enough to support the tensioning.

Figure 4:
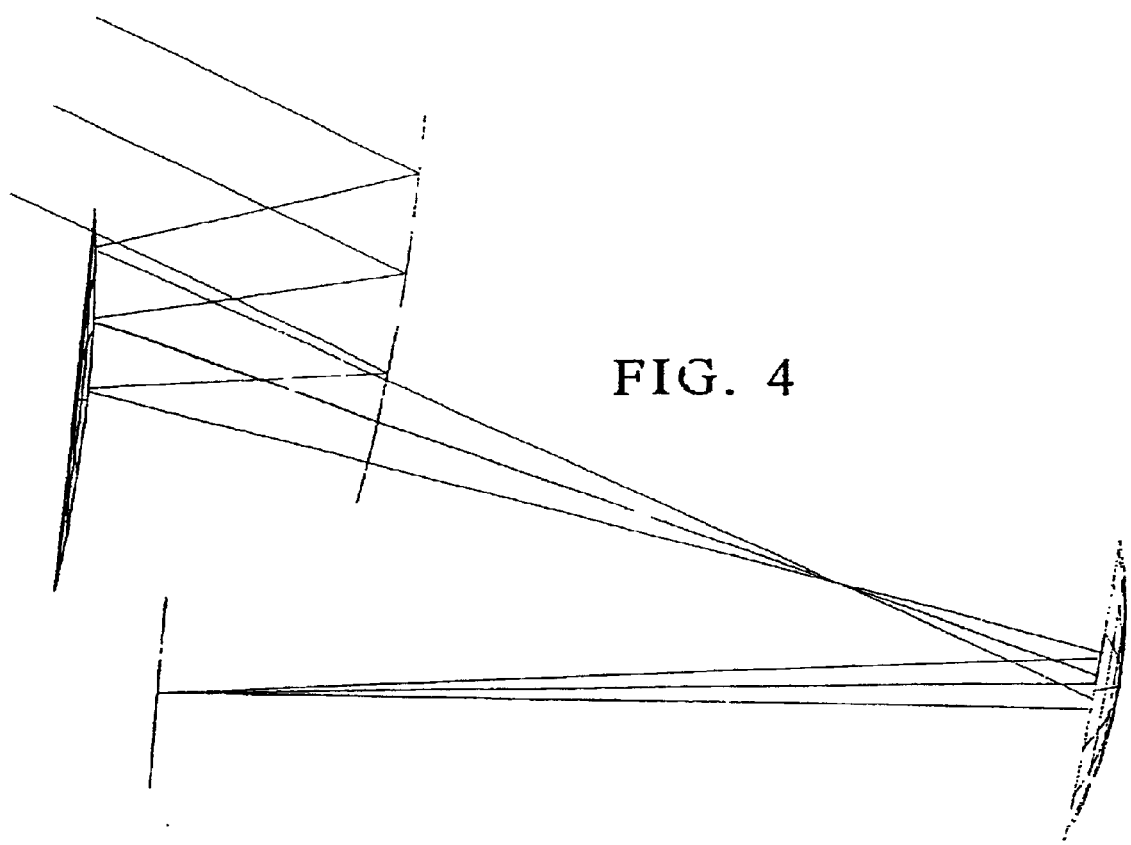
FIG. 4 shows a two-mirror primary reflector along with a tertiary correction reflector.

The system's field-of-view can be increased by adding a tertiary reflector as shown in FIG. 4. It also should be noted that any curve can be used to define the boundary of the curved membrane. However, a parabolic curve is the only one that gives point focus for a two reflector system.

Figure 5:
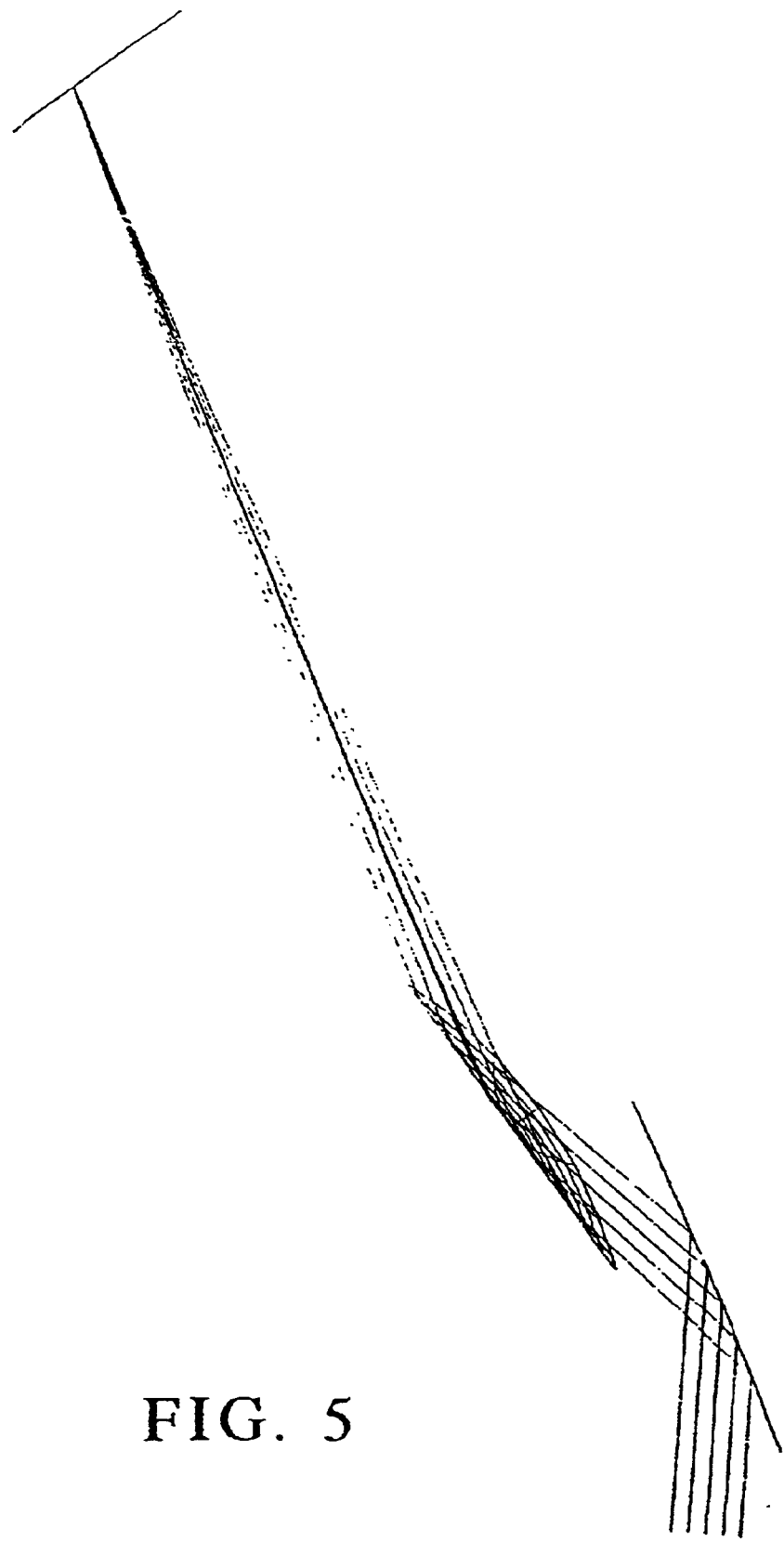
FIG. 5 shows a glancing incidence two-mirror primary reflector system.

A third variant of the two mirror primary is illustrated in FIG. 5. The individual reflectors in this embodiment are very far off-axis, with the result being that the incident electromagnetic radiation is at glancing incidence to the surfaces. This is useful for constructing an imaging system for high energy photons such as very deep ultraviolet or x-ray radiation.

Surfaces with non-zero Gaussian curvature only can be formed by stretching or deforming a membrane along both axes. The shape and curvature the surface assumes depends upon the boundary over which the membrane is stretched, the pressure, and the mechanical material properties of the membrane. If the boundary is circular, an axisymmetric reflector will result. However, the boundary need not be circular nor planar. The only requirement is that the boundary be described by a space curve that closes upon itself. Depending upon the boundary, such a surface can be approximated by a torus—a surface which has two radii of curvature. An off-axis segment of a conic can be locally approximated by a torus. Hence, the surface constructed can have useful optical properties, such as the concentration of electromagnetic radiation.

Specifically, the pressure formed surface is constructed with a number of sub-elements to the process. Such elements include: (1) the boundary; (2) the clamp used to hold the membrane without slipping; (3) the membrane material; and (4) hybrid designs with reflective and refractive components.

The boundary may be described parametrically as a space curve having coordinates $$\begin{pmatrix} x \\ y \\ z \end{pmatrix} = \begin{pmatrix} f(\theta) \\ g(\theta) \\ h(\theta) \end{pmatrix}$$

where f, g, and h are periodic with period $2\pi$, and $\theta$ is the parameter (which also corresponds to the angle around the circumference of the boundary). The requirement that f,g,h (0)=f,g,h($2\pi$) is simply that the space curve closes upon itself. Since any periodic function can be completely described as a series expansion, the above form for the boundary is quite general.

Figure 6:
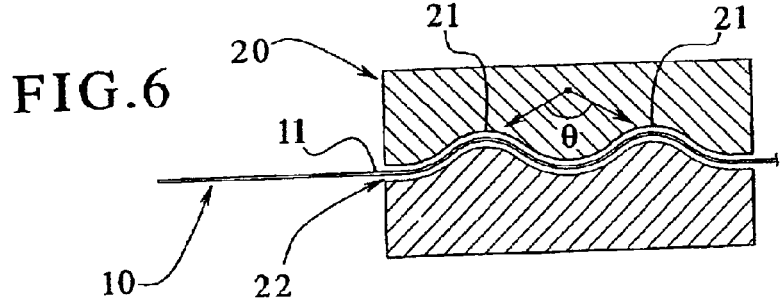
FIG. 6 shows a cross sectional view of a clamp arrangement with interlocking grooves holding the membrane of the present invention.

A key element to the successful implementation of the pressure deformed membrane is that the membrane not slip with respect to the boundary. To achieve this, and as shown in FIG. 6, a clamp 20 was developed that incorporates undulating self-interlocking grooves 21 (termed Yin-Yang grooves) with which the membrane 10 is clamped. The primary function of the grooves 21 is to reduce the tension in the membrane 10 by the factor $$\frac{T}{T_0} = e^{-n\mu\theta}$$

where $T_0$ is the tension at the edge 11 of the membrane 10 corresponding to the boundary 22, n is the number of grooves 21, $\mu$ is the coefficient of friction between the membrane 10 and claim 20, and $\theta$ is the angle through which the membrane 10 is deformed over the grooves 21. Typical values for the membrane 10 and claim 20 used in the tests are $\mu$=0.61 (aluminum on mild steel), $\theta$=1.05 radians (60 degrees), and n=5. The overall reduction in tension is approximately a factor of 25.

Figure 7:
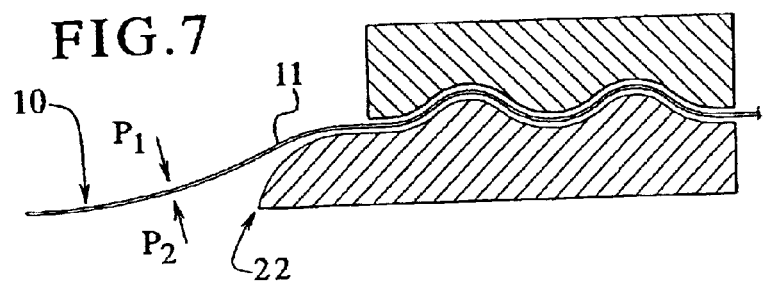
FIG. 7 shows a cross sectional view of a clamp arrangement having an integral boundary.

Referring now to FIG. 7, an alternative embodiment of the present invention is shown wherein an inwardly-extending boundary 22 is shown integrally-formed with the clamp 20. By extending the boundary 22 from the edge of the clamp 20 itself, the membrane 10 always remains substantially tangent to the edge of the clamp 20 with the result being that the stress on the membrane 10 is only in the plane of the membrane 10. Such design serves to decouple the clamp 20 from the boundary 22 and to impart, generally, greater reliability to the overall structure. Such design ramifications are applicable to FIGS. 8 and 9, as well.

Figure 8:
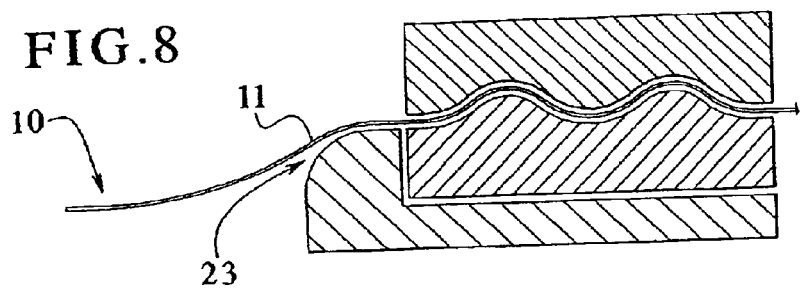
FIG. 8 shows a cross sectional view of a clamp arrangement along with a separate boundary.
Figure 9:
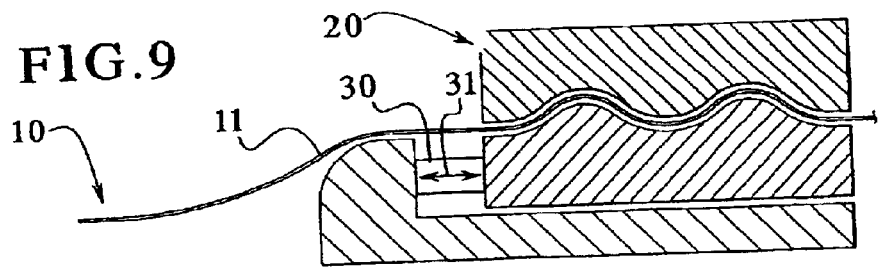
FIG. 9 shows a cross sectional view of a clamp arrangement with a separate boundary as well as an actuator which is used to figure a surface of the associated membrane.

FIG. 8 is similar to the clamp arrangement shown in FIG. 7, but it has a boundary portion 23 which is separate and apart from the clamp 20. As shown in FIG. 9, such boundary portion 23 may be used in conjunction with an actuator 30 whereby the boundary portion 23 may be inwardly/outwardly adjusted along directions 31 so as to simultaneously adjust the edge 11 of the membrane 10 according to desired design criteria.

Figure 10:
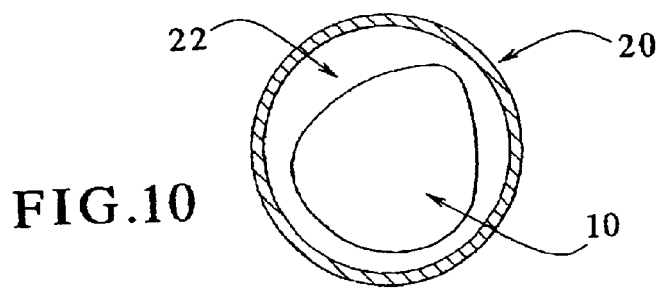
FIG. 10 shows a top view of a substantially circular clamp arrangement in conjunction with a non-circular boundary.

Referring now to FIG. 10, a top cross-sectional view is shown of a combination clamp 20 and boundary 22 arrangement wherein it is clear that the boundary 22 is not substantially circular. Indeed, in accordance with the teachings of the present invention, such boundary may be elliptical, egg-shaped, or asymmetric, for example.

Generally, if the elastic limit of the material composing the membrane 10 is exceeded, the deformation will be permanent wherein the pressure may be released, resulting in a self supporting reflector. If the elastic limit is not exceeded, a means of maintaining tension in the membrane 10 is necessary to hold the membrane 10 in the deformed state.

The formed surface can either refract or reflect electromagnetic radiation depending upon the dielectric properties of the membrane 10. If the dielectric constant is real, the incident radiation will be predominately refracted with the optical properties of the system determined by the shape, curvature, and dielectric constant of the membrane 10. If the system is not self supporting and a gas or liquid is used to support the membrane 10, the dielectric constant of this material also must be taken into account when determining the refractive properties of the system.

The desired surface can be constructed by stretching a thin membrane 10 beyond its elastic limit, and then tensioning the membrane 10 by keeping a constant pressure differential on the surface. This results in a membrane 10 that has a substantially uniform or continuous support over its entire surface. The supporting ring structure, or clamp 20, preferably is made of a low mass stiff material such as a carbon fiber/epoxy composite. The resulting reflector will be near the final correct shape, be very low-mass, and have controllable thermal characteristics.

Figure 11:
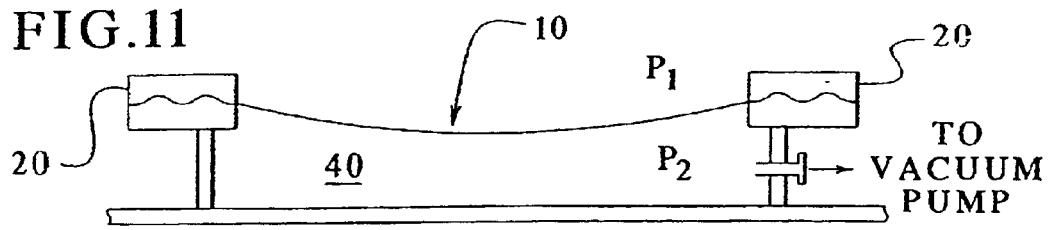
FIG. 11 shows a cross sectional view of a clamped membrane stretched over a chamber that may be evacuated.

With reference now to a specific physical embodiment of the present invention, FIG. 11 illustrates the formation of a membrane 10 through the evacuation of gas in a rigid volume 40. Such membrane 10, as previously described in connection with FIGS. 6 through 9, is secured within a clamp 20 prior to such evacuation. Pursuant to this process, wherein the pressure $P_2$ is less than $P_1$, the membrane 10 takes on a substantially concave shape.

Figure 12:
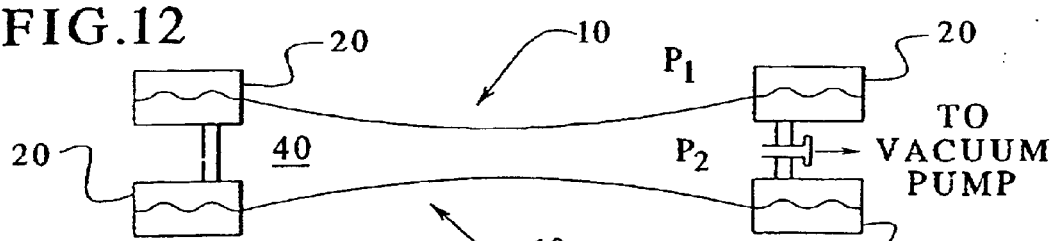
FIG. 12 shows a cross sectional view of a clamp arrangement wherein two membranes simultaneously undergo deformation.

FIG. 12 shows an alternative embodiment of the present invention wherein front and back rigid membranes 10 are stretched across a rigid volume 40. As in FIG. 11, the rigid volume 40 is at a pressure $P_2$ which is less than the pressure $P_1$ outside of such volume.

Figure 13:
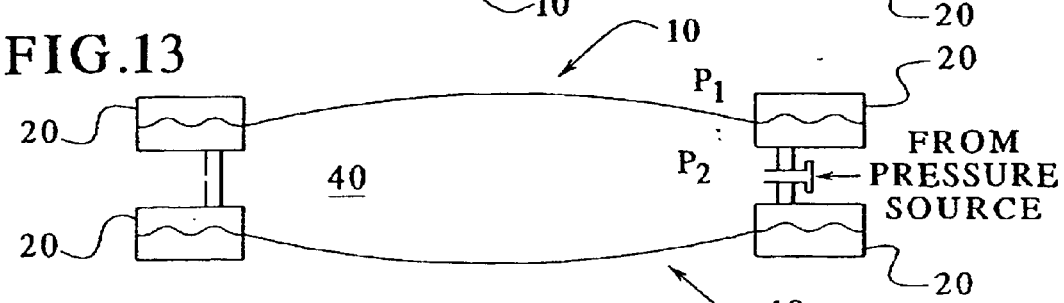
FIG. 13 shows a cross sectional view of two membranes simultaneously undergoing deformation wherein an internal pressure is greater than an external pressure.

Referring to FIG. 13, an embodiment of the present invention is shown wherein the pressure $P_2$ within the rigid volume 40 is greater than the pressure outside of such volume. As such, the rigid membranes 10 are outwardly deformed so as to take on a substantially convex shape.

Generally, the pressurized membrane 10 forms a shape that minimizes the total energy of the overall system consisting of the membrane 10, the pressuring gas and the structure rigidly holding the membrane 10; preferably the clamp 20. There are three distinct shapes that can form depending upon how the tension, $\gamma$, in the membrane 10 distributes itself.

The simplest shape is that of the soap film, where $\gamma$ is constant throughout the film. Next is a rigid membrane 10 that remains elastic, but has considerable deformation. Here $\gamma(\theta,\phi)$, is not constant given that at the boundary 22, where the membrane 10 is clamped, the tension in the azimuthal direction is fixed. However, in the free (radial) direction the tension can change. The third case is that of plastic deformation. Again $\gamma(\theta,\phi)$ is not constant, but when the pressure is released the membrane 10 does not return to its original state. This is the situation pertaining to membrane reflectors.

By choosing the appropriate curve for the boundary 22 and pressurizing the film so that it bulges out from the boundary 22, convex or concave surfaces can be formed. In the simplest incarnation, the boundary 22 can be chosen so that the film is a segment of a torus. This is significant because a segment of any surface with a non-zero mean curvature can be approximated to some degree by a torus (a surface that has two radii of curvature). An off-axis segment of an ellipse or parabola can be fit quite well by a torus. In fact $$p/2\Upsilon = \left(\frac{1}{r_1} + \frac{1}{r_2}\right),$$

where $r_1$ $r_2$ are the two ardii of curvature of the surface, $\rho$ is the pressure, and $\gamma$ is the surface tension.

The shape of the membrane 10 is taken to be a conic section with additional higher order polynomial terms. The form of a conic used is $$z(r) = \frac{cr^2}{1+\sqrt{1-sc^2y^2}} + \sum_{i=0}^{n} a_i x_i.$$

This form for a conic is appropriate if the boundary 22 is circularly symmetric. If the boundary 22 is not circularly symmetric, or one wants to be a fit to see how symmetric the surface is, the form used is called a biconic and is represented as $$z(r) = \frac{c_x x^2 + c_y y^2}{1+\sqrt{1-s_x c_x^2 x^2 - s_y c_y^2 y^2}} + \sum_{i,j=0}^{n} a_{ij} x^i x^j.$$

It is clear by inspection that a biconic reduces to a symmetric conic of $c_x=c_y$, and $s_x=s_y$.

The actual reflecting surface must be isotropic if the resulting surface, after stretching, is to have a predictable shape. A large membrane 10 can be difficult to construct unless smaller membranes are somehow joined together. Any such process will undoubtedly generate anisotropy in the mechanical properties of the membrane 10.

One solution to the problem is to use electroformed foil. A sheet arbitrarily large can be formed by this process. Additionally, the surface quality of the membrane 10 will take on the surface quality of the tool that the membrane 10 was electroformed onto. Thus, an optical quality membrane surface of arbitrarily large dimensions is constructable.

The above discussion focuses upon reflective optics. This section will concentrate upon using a membrane 10 pressurized with a gas to construct a large low-mass light concentrator. The technology is identical to that discussed for stretched metallic reflectors, but the functions of the individual components are changed. Specifically, the membrane 10 is used to contain the gas and give shape to the gas which is providing the refraction. It is also possible to use a reflective-refractive hybrid design.

The membrane 10 itself has not functionality in the final refraction of the incident light. This can be seen by noting that the membrane 10 is thin and that the incident light is merely shifted or displayed by refraction at the membrane 10. The refraction providing the concentration is due to the gas. The thick lensmakers equation provides us with a quantitative method of calculating the focal length of the gas-membrane lens:

$$f = \frac{nR^2}{(n-1)(2Rn-t(n-1))}$$

where n is the index of refraction of the gas, t is the thinkness, and R is the radius of curvature of the membrane 10.

For a typical diatomic gas (such as Nitrogen or Oxygen) the index of refraction typically has a value of 1.0003. Organic gases have a larger index with CarbonDisulfide and Benzene having indices of 1.0015 and 1.0017, respectfully. The variation of the index with temperature and pressure follow the form $$n(T,P) = 1 + \frac{n_o(T_o)-1}{1+a(T-T_o)} \frac{P}{P_o}$$

where a is the coefficient of expansion of the gas with temperature T, and P is the pressure. Thus, for a membrane refractor with radius of curvature of 10 meters a focal length of $$f = 2941 \frac{P_o}{P} \frac{1+a(T-T_o)}{n_o(T_o)-1}$$

with f in meters. The focal length can be reduced by increasing the pressure of the gas, or by increasing its density of cooling.

The areal density will scale as the membrane reflectors do. The dominant contributions to the mass are the edge support (clamp 20 and boundary 22) and the membrane 10. The gas has an insignificant contribution.

Figure 14:
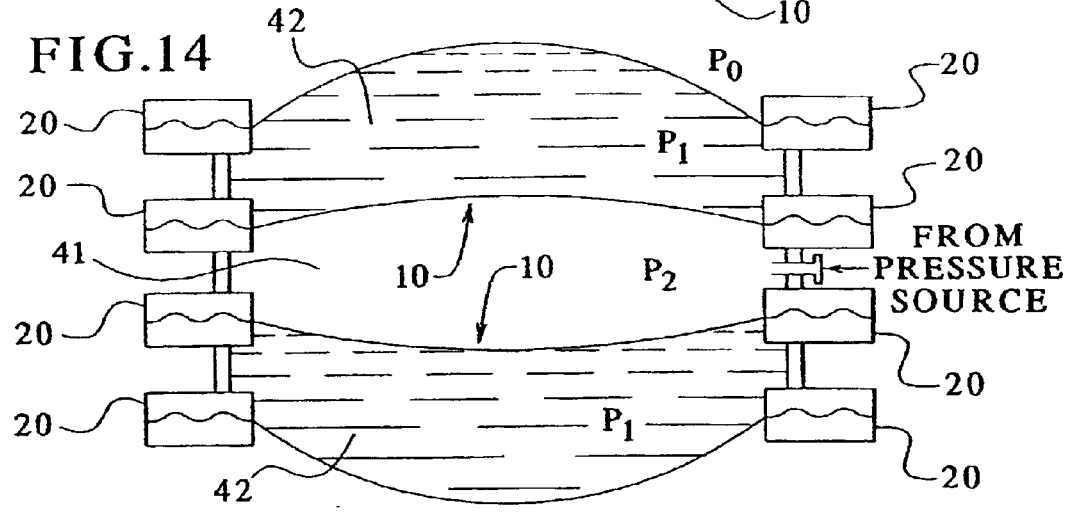
FIG. 14 shows an example of a pressure formed lens.

Pursuant to an alternative embodiment of the present invention, as shown in FIG. 14, the membranes 10 may be incorporated as part of a gas-liquid lens. According to such construction, the lens includes a liquid 42 having a refractive index n, as well as a separately-defined center region 41 which contains a gas. The pressure $P_2$ in the center region 41 is greater than a pressure $P_1$ in the liquid filled shaded region 42 which is, in turn, greater than the pressure in the outer regions $P_0$. The optical properties of the system shown in FIG. 14 are determined primarily by the index n of the liquid and the shapes and curvature of the surfaces of the four membranes 10.

Figure 15:
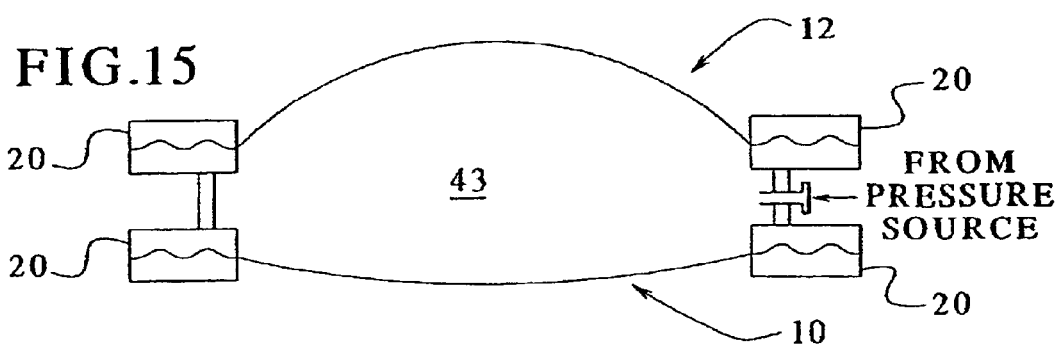
FIG. 15 shows a combination pressure refractor/reflector wherein gas or liquid provides tensioning of the membrane.

FIG. 15 offers yet another embodiment of the present invention which is a combination dielectric-reflective system. More specifically, such embodiment includes the combination of a reflective membrane 10 with a dielectric membrane 12. Disposed therebetween is a volume 43 which is pressurized with a gas or a liquid. The resulting structure first refracts the incident radiation via the dielectric membrane 12 and then reflects the radiation from the membrane 10. Should the focal region of such arrangement be outside of the dielectric membrane 12, the dielectric membrane 12 again refracts the radiation from the reflective membrane 10. If not, the focal region of the system is contained within the volume 43.

Figure 16:
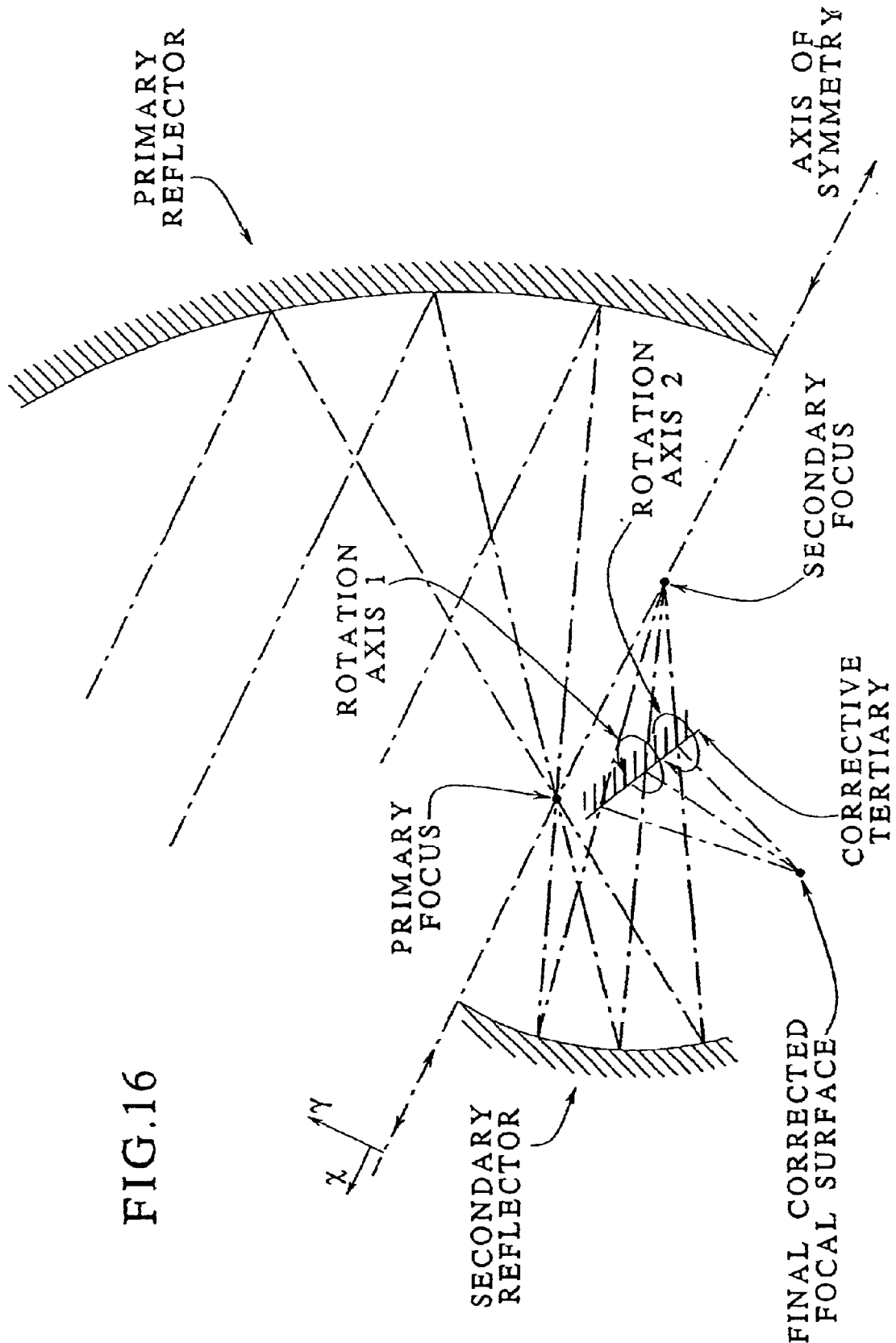
FIG. 16 illustrates the function of a tertiary correction reflector along with a two-mirror primary system.

Referring now to FIG. 16, which illustrates a tertiary and scanning reflector, the tertiary is located at an image of the primary. This location is ideal for correcting the shape imperfections of the primary reflector. This can be seen by noting that a point on the primary is imaged to a point on the tertiary via the secondary reflector. Thus, by distorting the tertiary opposite to the shape imperfection of the primary a corrective system is produced.

A complementary use for the tertiary is to allow fast scanning or tracking of an observation point by rotating the tertiary about an axis perpendicular to the optical axis. Since the tertiary is located at an image of the primary, this is optically equivalent to moving the primary. The tertiary is smaller than the primary, so the scanning or tracking can be accomplished with higher performance.

Although the present invention has been described with reference to specific embodiments, those of skill in the art will recognize that changes may be made thereto without departing from the spirit and scope of the invention as set forth in the hereafter appended claims.

I claim as my invention:

1. An apparatus for electromagnetic radiation concentration, comprising:
   a peripherally-disposed boundary member, the boundary member having a shape defined as a space curve which closes upon itself; and
   a one-piece membrane stretched over and secured to the boundary member, wherein the boundary member serves as a sole support device for the membrane, the membrane having both a curved shaped and a substantially isotropic thickness and being supported entirely upon the boundary member at outermost edges of the membrane, wherein the membrane is permanently deformed to have the curved shape with no constant pressure being required thereupon.

2. An apparatus for electromagnetic radiation concentration as claimed in claim 1, wherein the membrane is pressure-formed to obtain the curved shape and substantially isotropic thickness.

3. An apparatus for electromagnetic radiation concentration as claimed in claim 1, wherein the curved shape has a zero Gaussian curvature.

4. An apparatus for electromagnetic radiation concentration as claimed in claim 1, wherein the curved shape has a non-zero Gaussian curvature.

5. An apparatus for electromagnetic radiation concentration as claimed in claim 1, wherein the membrane is elastically deformed to have the curved shape.

6. An apparatus for electromagnetic radiation concentration as claimed in claim 1, wherein the curved shape is a biconic form with additional higher order polynomial terms.

7. An apparatus for electromagnetic radiation concentration as claimed in claim 1, wherein the membrane is formed from a single piece of electroformed foil.

8. An apparatus for electromagnetic radiation concentration as claimed in claim 1, wherein the curved shape concentrates reflected electromagnetic radiation to an off-axis region.

9. An apparatus for electromagnetic radiation concentration as claimed in claim 1, further comprising:
   a high electrical conductivity material formed over a surface of the membrane for reflectivity.

10. An apparatus for electromagnetic radiation concentration as claimed in claim 1, wherein the boundary member is substantially circular.

11. An apparatus for electromagnetic radiation concentration as claimed in claim 1, wherein the boundary member is non-circular.

12. An apparatus for electromagnetic radiation concentration as claimed in claim 1, wherein the boundary member is substantially planar.

13. An apparatus for electromagnetic radiation concentration as claimed in claim 1, wherein the boundary member is non-planar.

14. A method for forming an apparatus for electromagnetic radiation concentration, comprising the steps of:
   providing a peripherally-disposed boundary member, the boundary member having a shape defined as a space curve which closes upon itself;
   placing a one-piece, stretchable membrane over the boundary member;
   securing outermost edges of the membrane to the boundary member, wherein the boundary member serves as a sole support device for the membrane;
   deforming the membrane to effect both a curved shape and a substantially isotropic thickness to the membrane; and
   supporting the membrane entirely upon the boundary member at the outermost edges of the membrane, wherein the membrane is permanently deformed to have the curved shape with no constant pressure being required thereupon.

15. A method of forming an apparatus for electromagnetic radiation concentration as claimed in claim 14, wherein the curved shape has a zero Gaussian curvature.

16. A method of forming an apparatus for electromagnetic radiation concentration as claimed in claim 14, wherein the curved shape has a non-zero Gaussian curvature.

17. A method of forming an apparatus for electromagnetic radiation concentration as claimed in claim 14, wherein the step of deforming the membrane includes applying pressure to one side of the membrane.

18. A method of forming an apparatus for electromagnetic radiation concentration as claimed in claim 17, wherein the applied pressure is positive pressure.

19. A method of forming an apparatus for electromagnetic radiation concentration as claimed in claim 17, wherein the applied pressure is negative pressure.

20. A method of forming an apparatus for electromagnetic radiation concentration as claimed in claim 17, further comprising the step of:
   cooling the boundary member after the step of applying pressure so as to cool and rigidize the membrane.

21. A method of forming an apparatus for electromagnetic radiation concentration as claimed in claim 14, wherein the curved shape is a biconic form with additional higher order polynomial terms.

22. A method of forming an apparatus for electromagnetic radiation concentration as claimed in claim 14, wherein the membrane is formed from a single piece of electro-formed foil.

23. A method of forming an apparatus for electromagnetic radiation concentration as claimed in claim 14, further comprising the step of:
   applying a high electrical conductivity material over a surface of the membrane for reflectivity.

24. A method of forming an apparatus for electromagnetic radiation concentration as claimed in claim 14, wherein the curved shape concentrates reflected electromagnetic radiation to an off-axis region.

25. A method for forming an apparatus for electromagnetic radiation concentration as claimed in claim 14, wherein the boundary member is substantially circular.

26. A method for forming an apparatus for electromagnetic radiation concentration as claimed in claim 14, wherein the boundary member is non-circular.

27. A method for forming an apparatus for electromagnetic radiation concentration as claimed in claim 14, wherein the boundary member is substantially planar.

28. A method for forming an apparatus for electromagnetic radiation concentrations claimed in claim 14, wherein the boundary member is non-planar.

* * * * *